(12) United States Patent
Youn et al.

(10) Patent No.: US 11,364,894 B2
(45) Date of Patent: Jun. 21, 2022

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Seok-young Youn, Seoul (KR); Jimin Han, Seoul (KR); Jia Lee, Seoul (KR); Kye Yoon Kim, Gunpo-si (KR); Seunghyun Woo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 449 days.

(21) Appl. No.: 16/507,912

(22) Filed: Jul. 10, 2019

(65) Prior Publication Data
US 2020/0130674 A1    Apr. 30, 2020

(30) Foreign Application Priority Data
Oct. 29, 2018 (KR) .................. 10-2018-0130281

(51) Int. Cl.
*B60W 30/02* (2012.01)
*B60W 40/02* (2006.01)
(Continued)

(52) U.S. Cl.
CPC .......... *B60W 30/025* (2013.01); *B60K 37/06* (2013.01); *B60W 40/02* (2013.01); *B60W 40/08* (2013.01); *G02B 27/0093* (2013.01); *G02B 27/34* (2013.01); *G06F 3/005* (2013.01); *G06F 3/011* (2013.01); *G06F 3/017* (2013.01); *B60K 2370/148* (2019.05); *B60W 2420/42* (2013.01); *G02B 2027/0187* (2013.01)

(58) Field of Classification Search
CPC .... B60W 30/00; B60W 30/02; B60W 30/025; B60W 40/00; B60W 40/02; B60W 40/08; B60W 2420/00; B60W 2420/42; B60K 37/00; B60K 37/04; B60K 37/06; B60K 2370/00; B60K 2370/10; B60K 2370/12; B60K 2370/148; G02B 27/0093; G02B 27/34; G02B 2027/0187; G02B 27/00; G02B 27/01; G02B 27/32; G02B 27/0179; G06F 3/00; G06F 3/002; G06F 3/005; G06F 3/01; G06F 3/011; G06F 3/017
See application file for complete search history.

(56) References Cited

U.S. PATENT DOCUMENTS

2005/0135636 A1    6/2005    Putti
2011/0040707 A1    2/2011    Theisen
(Continued)

FOREIGN PATENT DOCUMENTS

KR    101506561 B1    3/2015

*Primary Examiner* — Geepy Pe
*Assistant Examiner* — Michael Allen Brace, Jr.
(74) *Attorney, Agent, or Firm* — Lempia Summerfield Katz LLC

(57) ABSTRACT

A vehicle includes at least one speaker, a camera configured to obtain a passenger's image, and a controller. The controller is configured to identify the passenger, to search for the identified passenger and emotion tag information related to a sound source output through the at least one speaker, and to control the at least one speaker or obtain passenger's emotional information according to the search result.

14 Claims, 7 Drawing Sheets

(51) Int. Cl.
*B60W 40/08* (2012.01)
*B60K 37/06* (2006.01)
*G02B 27/00* (2006.01)
*G06F 3/00* (2006.01)
*G06F 3/01* (2006.01)
*G02B 27/34* (2006.01)
*G02B 27/01* (2006.01)

(56) References Cited

U.S. PATENT DOCUMENTS

| | | |
|---|---|---|
| 2011/0083075 A1 | 4/2011 | Macneille |
| 2012/0143391 A1* | 6/2012 | Gee ........................ B60K 37/06 |
| | | 701/1 |
| 2013/0054090 A1 | 2/2013 | Shin |
| 2014/0188920 A1 | 7/2014 | Sharma |
| 2014/0294210 A1 | 10/2014 | Healey |
| 2015/0053066 A1* | 2/2015 | Hampiholi ............. B60K 37/06 |
| | | 84/602 |
| 2015/0110471 A1 | 4/2015 | Zheng |
| 2016/0165337 A1 | 6/2016 | Trestain |
| 2017/0080856 A1* | 3/2017 | Enomoto .................. A61B 5/18 |
| 2018/0061415 A1* | 3/2018 | Penilla ................ G01C 21/3641 |
| 2018/0281812 A1* | 10/2018 | Tochioka ............ B60W 30/025 |
| 2019/0049957 A1* | 2/2019 | Healey ................. G05D 1/0221 |
| 2019/0135325 A1* | 5/2019 | Lisseman ............... H04N 5/247 |

* cited by examiner

FIG. 5

<CORRELATION BETWEEN BIO-SIGNALS AND EMOTION FACTORS>

| BIO-SIGNAL \ EMOTION FACTOR | Disgust | Anger | Fear | Anxiety | Sadness | Stress | Frustration | Boredom | Neutral | Interest | Distress | Platonic Love | Romantic Love | Pleasure | Joy |
|---|---|---|---|---|---|---|---|---|---|---|---|---|---|---|---|
| GSR | .875 | .775 | .653 | .353 | .545 | | | | .655 | .545 | | | | | .353 |
| EEG | .555 | 0.864 | .878 | | .545 | | .464 | .477 | .577 | | | | .353 | | |
| Facial Expression | .545 | | .645 | | 0.817 | .545 | | | | | | | | | |

<EMOTION MODEL>

(12) United States Patent

VEHICLE AND METHOD OF CONTROLLING THE SAME

CROSS-REFERENCE TO RELATED APPLICATION(S)

This application is based on and claims priority under 35 U.S.C. § 119 to Korean Patent Application No. 10-2018-0130281, filed on Oct. 29, 2018 in the Korean Intellectual Property Office, the disclosure of which is incorporated by reference in its entirety.

TECHNICAL FIELD

Embodiments of the disclosure relate to a vehicle and a method of controlling the vehicle, and more particularly, to a technology of controlling a size and a direction of sound output through at least one speaker in a vehicle in consideration of a passenger's emotion or emotional state.

BACKGROUND

In modern society, vehicles are a common means of transportation and the number of people using vehicles is continuously increasing. The development of vehicle technologies is greatly changing lives, such as making it easy for people to take long-distance trips, and the like.

In recent years, technologies have been developed to determine a driver's emotional state, i.e., emotion, and increase the driver's convenience in accordance with the driver's emotion. For example, there is a technology using bio-signals to determine the driver's emotion.

Emotion recognition using the bio-signals may be performed through voice recognition, face recognition, hand gesture recognition, and heartbeat recognition. This method uses a body part of a person, which changes according to the person's emotion, so that highly accurate determination of the emotion can be made. Thus, many studies are being conducted on the field of biometrics.

However, the prior art mainly recognizes the emotion based on the driver and provides feedback according to the emotions of the driver and does not consider the emotion of a passenger.

SUMMARY

Therefore, it is an aspect of the disclosure to provide a vehicle capable of obtaining emotional information of a passenger in the vehicle, i.e., passenger emotional information, with respect to content output through at least one speaker in the vehicle and automatically controlling a size and an output direction of the at least one speaker output according to the passenger emotional information. It is another aspect of the disclosure to provide a method of controlling the vehicle.

Additional aspects of the disclosure are set forth in part in the description which follows and, in part, will be understood from the description, or may be learned by practice of the disclosure.

In accordance with an aspect of the disclosure, a vehicle includes at least one speaker, a camera configured to obtain an image of a passenger, i.e., a passenger image and a controller. The controller is configured to identify the passenger, to search for the identified passenger and emotion tag information related to a sound source output through the at least one speaker, and to control the at least one speaker or obtain passenger emotional information according to the search result.

The controller may identify a position of the passenger, i.e., a passenger position, when the emotion tag information is detected. The controller may further control an output size or an output direction of the at least one speaker based on the passenger position and the detected emotion tag information.

The controller may obtain, when the emotion tag information is not detected, the passenger emotional information for a predetermined time after the sound source is output and may determine the passenger position. The controller may also control an output size or an output direction of the at least one speaker based on the obtained passenger emotional information and the passenger position.

The controller may extract an emotion factor from the obtained passenger emotional information. The controller may further control the output size or the output direction of the at least one speaker so that the emotion factor is increased or decreased.

The controller may generate the emotion tag information based on the controlled output size of the at least one speaker or the controlled output direction of the at least one speaker corresponding to the obtained passenger emotional information. The controller may further add the generated emotion tag information to the output sound source.

The controller may extract a facial expression of the passenger, i.e., a passenger facial expression, from the passenger image obtained for the predetermined time after the sound source is output. The controller may also obtain the passenger emotional information based on the extracted passenger facial expression.

The controller may identify, when there are a plurality of the passengers, the plurality of passengers and positions of each of the plurality of passengers, may search for a plurality of emotion tag information related to each of the plurality of passengers, and may control the at least one speaker or obtain the emotion information of each of the plurality of passengers according to the search result.

The controller may control the output size or the output direction of the at least one speaker based on the detected plurality of emotion tag information and the position of each of the plurality of passengers when the plurality of emotion tag information related to each of the plurality of passengers is detected.

The controller may obtain, when the plurality of emotion tag information related to each of the plurality of passengers is not detected, the emotion information of each of the plurality of passengers for the predetermined time after the sound source is output. The controller may further control the output size or the output direction of the at least one speaker based on the obtained emotion information of each of the plurality of passengers and the position of each of the plurality of passengers.

The controller may generate the plurality of emotion tag information based on the controlled output size of the at least one speaker or the controlled output direction of the at least one speaker corresponding to the obtained emotion information of each of the plurality of passengers. The controller may also add the generated plurality of emotion tag information to the output sound source.

In accordance with another aspect of the disclosure, a method of controlling a vehicle includes outputting a sound source through at least one speaker. The method further includes obtaining, by a camera, a passenger image, and identifying, by a controller, the passenger and the passenger position. The method also includes searching for, by the controller, the identified passenger and emotion tag information related to the output sound source. The method further includes controlling, by the controller, the at least one speaker or obtaining, by the controller the passenger emotional information according to the search result.

The method may further include controlling, by the controller, an output size or an output direction of the at least one speaker based on the passenger position and the detected emotion tag information when the emotion tag information is detected.

The method may further include obtaining, by the controller, the passenger emotional information for a predetermined time after the sound source is output when the emotion tag information is not detected. The method may also include controlling, by the controller, an output size or an output direction of the at least one speaker based on the obtained passenger emotional information and the passenger position.

The controlling of the output size or the output direction of the at least one speaker may further include extracting an emotion factor from the obtained passenger emotional information. The controlling of the output size may further include controlling the output size or the output direction of the at least one speaker so that the emotion factor is increased or decreased.

The method may further include generating, by the controller, the emotion tag information based on the controlled output size or output direction of the at least one speaker corresponding to the obtained passenger emotional information. The method may also include adding, by the controller, the generated emotion tag information to the output sound source.

The method may further include extracting, by the controller, the passenger facial expression for the predetermined time after the sound source is output. The method may also include obtaining, by the controller, the passenger emotional information based on the extracted passenger facial expression.

In accordance with another aspect of the disclosure, a method of controlling a vehicle includes outputting a sound source through at least one speaker. The method further includes obtaining, by a camera, images for a plurality of passengers, and identifying, by a controller, the plurality of passengers and position of each of the plurality of passengers. The method also includes searching for, by the controller, a plurality of emotion tag information related to each of the plurality of passengers and the output sound source. The method further includes controlling, by the controller, the at least one speaker or obtaining emotion information of each of the plurality of passengers according to the search result.

The method may further include controlling, by the controller, the output size or the output direction of the at least one speaker based on the detected plurality of emotion tag information and the position of each of the plurality of passengers when the plurality of emotion tag information related to each of the plurality of passengers is detected.

The method may further include obtaining, by the controller, the emotion information of each of the plurality of passengers for the predetermined time after the sound source is output when the plurality of emotion tag information related to each of the plurality of passengers is not detected. The method may also include controlling, by the controller, the output size or the output direction of the at least one speaker based on the obtained emotion information of each of the plurality of passengers and the position of each of the plurality of passengers.

The method may further include generating, by the controller, the plurality of emotion tag information based on the controlled output size of the at least one speaker or the controlled output direction of the at least one speaker corresponding to the obtained emotion information of each of the plurality of passengers. The method may also include adding, by the controller, the generated plurality of emotion tag information to the output sound source.

In accordance with another aspect of the present disclosure, a vehicle includes a speaker, a camera configured to obtain a passenger image, a processor, and a computer-readable medium coupled to the processor. The computer-readable medium includes a computer-executable code that, when executed by the processor, causes the processor to identify the passenger, to search for the passenger and emotion tag information related to a sound source output through the speaker, and to control the at least one speaker or obtain the passenger emotional information according to the search result.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a view illustrating correlation information between bio-signals and emotion factors;

DETAILED DESCRIPTION

Figure 1:
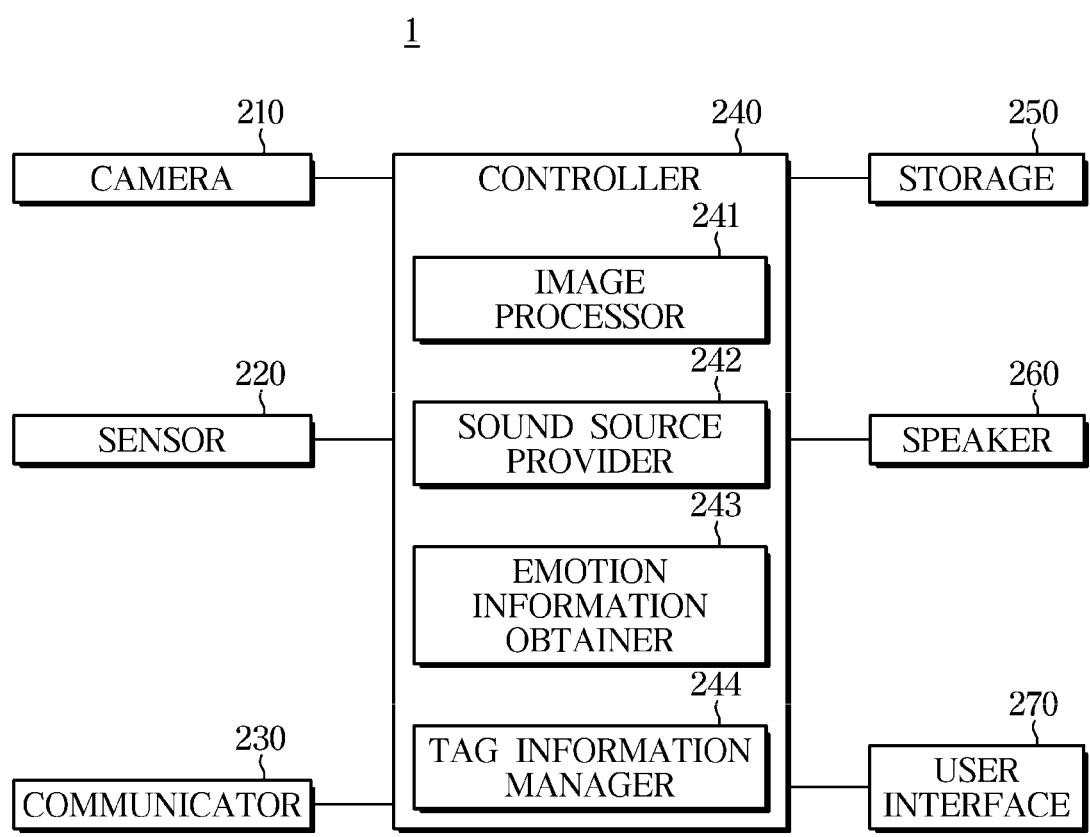
FIG. 1 is a control block diagram of a vehicle according to an embodiment.

Embodiments described herein and configurations illustrated in the accompanying drawings are only certain examples of the disclosure. Various modifications may be made at the time of filing of the present application to replace the embodiments and drawings of the present specification.

In addition, the terms used herein are intended to only describe certain embodiments. The terms shall by no means restrict and/or limit the disclosure. It is to be understood that the singular forms "a," "an," and "the" include plural referents unless the context clearly dictates otherwise.

In the present specification, the terms such as "comprising," "having" or "including" are intended to designate the presence of characteristics, numbers, steps, operations, elements, parts or combinations thereof, and shall not be construed to preclude any possibility of the presence or addition of one or more other characteristics, numbers, steps, operations, elements, parts or combinations thereof. In addition, although the terms including ordinal numbers such as "first" or "second" may be used herein to describe various elements, the elements should not be limited by such terms.

Embodiments of the disclosure are now described in detail with reference to the accompanying drawings to be readily practiced by a person of ordinary skill in the art. In the drawings, portions irrelevant to the description will not be illustrated in order to clearly describe the disclosure.

FIG. 1 is a control block diagram of a vehicle according to an embodiment.

Referring to FIG. 1, a vehicle 1 may include a camera 210, a sensor 220, a communicator 230, a controller 240, a storage 250, a speaker 260, and a user interface 270.

Figure 2:
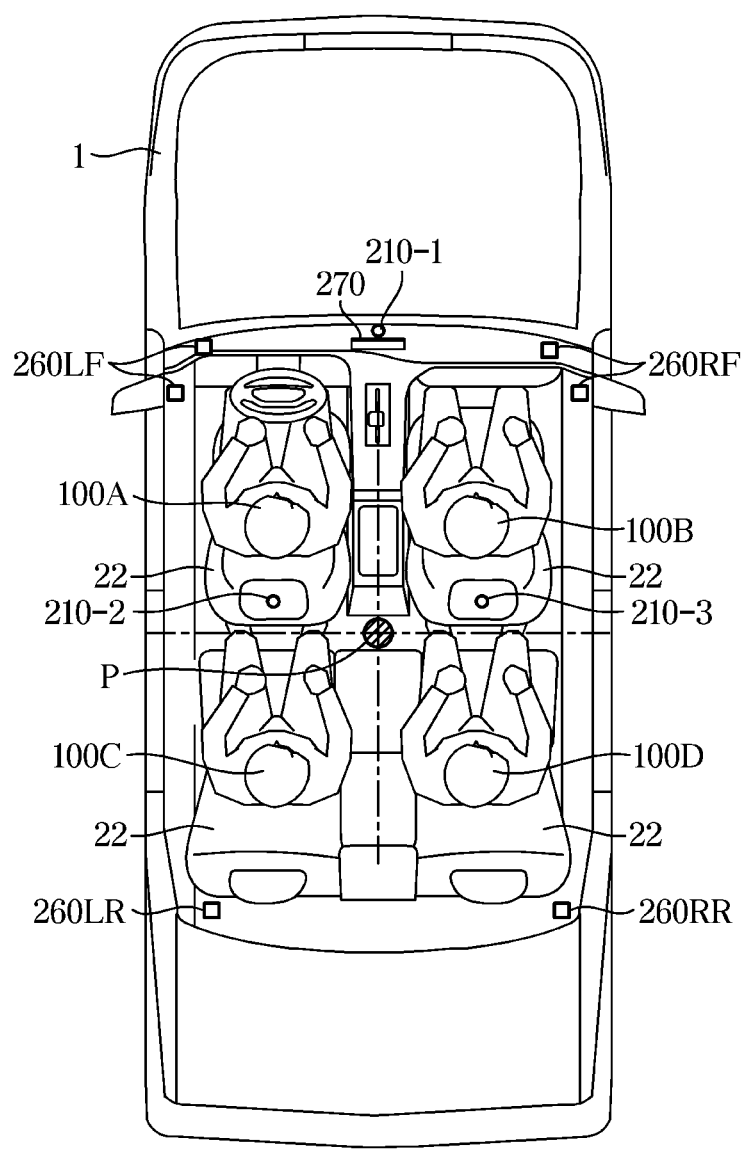
FIG. 2 and FIG. 3 are views for describing distribution of sound output through at least one speaker in a vehicle according to a passenger's position and the passenger's emotional information.

The camera 210 is provided inside the vehicle 1. The camera 210 may photograph a passenger, i.e., a driver or a passenger, getting in the vehicle 1 to obtain the passenger's image, i.e., a passenger image, and generate image data. Referring to FIG. 2, the camera 210 (210-1, 210-2, 210-3) may be installed on a dashboard, a windshield or a seat 22 of the vehicle 1. However, there is no limitation on the installation position and number of the cameras 210. The passenger's image, obtained by the camera 210, may be used by the controller 240 to understand the passenger's facial expression, i.e., a passenger facial expression, and detect the passenger's position, i.e., a passenger position. Therefore, the camera 210 may be installed in front of the passenger.

The sensor 220 may measure the passenger's bio-signal. The passenger's bio-signal may be transmitted to the controller 240 and stored in the storage 250. The sensor 220 may be installed at various positions in the vehicle 1. For example, the sensor 220 may be provided on the seat 22, a seat belt, and the like. In addition, the passenger's position may be identified based on a position at which the sensor 220 is installed and information obtained by the sensor 220.

The sensor 220 may include at least one of a galvanic skin response (GSR) sensor for measuring skin electrical conductivity of the passenger, a skin temperature sensor for measuring a skin temperature of the passenger, a heart rate (HR) sensor for measuring a heart rate of the passenger, an electroencephalogram (EEG) sensor for measuring brainwaves of the passenger, a voice recognition sensor for measuring a voice signal of the passenger, a face analysis device for analyzing the passenger's facial expression, or an eye tracker for tracking the positions of pupils. However, sensors that may be included in the sensor 220 are not limited to the above-mentioned sensors. The sensor 220 may include another sensor capable of measuring a person's bio-signal.

The communicator 230 may communicate with an external device to transmit and receive data. Also, the communicator 230 may receive content, correlation information between the passenger's bio-signal and an emotion factor, and an emotion model from the external device.

The communicator 230 may use various communication technologies. The communicator 230 may transmit and receive data to/from the external device by using various communication technologies, such as vehicle-to-vehicle (V2V) communication, wireless fidelity (Wi-Fi), wireless local area network (WLAN), Ultra-Mobile Broadband (UMB), Global Positioning System (GPS), Long-Term Evolution (LTE), and the like. The communicator 230 is not limited thereto and may be applied to any method that can communicate with the external device.

The controller 240 may transmit control signals to various devices in the vehicle 1. The controller 240 may refer to an electronic control unit (ECU). Although described as the controller 240, it is intended to be interpreted broadly, but is not limited thereto.

The controller 240 may include at least one memory storing a program for controlling the operations of the vehicle 1 and at least one processor for executing the stored program. The memory and the processor included in the controller 240 may be integrated into one chip or may be physically separated. The detailed configuration of the controller 240 is described below.

The storage 250 may store a sound source or content that can be output through the speaker 260, the passengers bio-signal collected by the sensor 220, the correlation information between the passenger's bio-signal and the emotion factor, the passenger's emotional information, i.e. passenger emotional information, the emotion model, and the like. Also, the storage 250 may store emotion tag information related to the sound source. The emotion tag information may refer to the passenger's emotional information related to the sound source. Data stored in the storage 250 may be transmitted to the controller 240.

The storage 250 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)), although not limited to these. The storage 250 may be a memory implemented as a separate chip, or the storage 250 and the processor may be integrated into a single chip.

On the other hand, the vehicle 1 may include at least one of the speakers 260 capable of outputting sound. In addition, the speaker 260 provided in the vehicle 1 may output sounds related to the performance of various devices in the vehicle 1. For example, the speaker 260 may output sound required to perform a music reproduction function, a radio function, a video function, a navigation function, and other additional functions that can be selected through the user interface 270.

Referring to FIG. 2, the speakers 260 (260LF, 260RF, 260LR, 260RR) may be provided at a position close to a left front seat, a right front seat, a left rear seat, and a right rear seat in the vehicle 1. The positions where the speakers 260 (260LF, 260RF, 260LR, 260RR) are provided are not limited, and the speakers 260 may be provided at various positions inside the vehicle 1.

The user interface 270 is an input/output device for performing the music reproduction function, the radio function, the video function, the navigation function, and other additional functions. The user interface 270 may receive information from the passenger and output a result corresponding to the input information. In addition, the user interface 270 may display environment information and driving information of the road. As illustrated in FIG. 2, the user interface 270 may be installed in the dashboard.

The user interface 270 may include a display. The display may be implemented with various panels. The display panel may be a light emitting diode (LED) panel, an organic light emitting diode (OLED) panel, a liquid crystal display (LCD) panel, or a touch panel.

Figure 4:
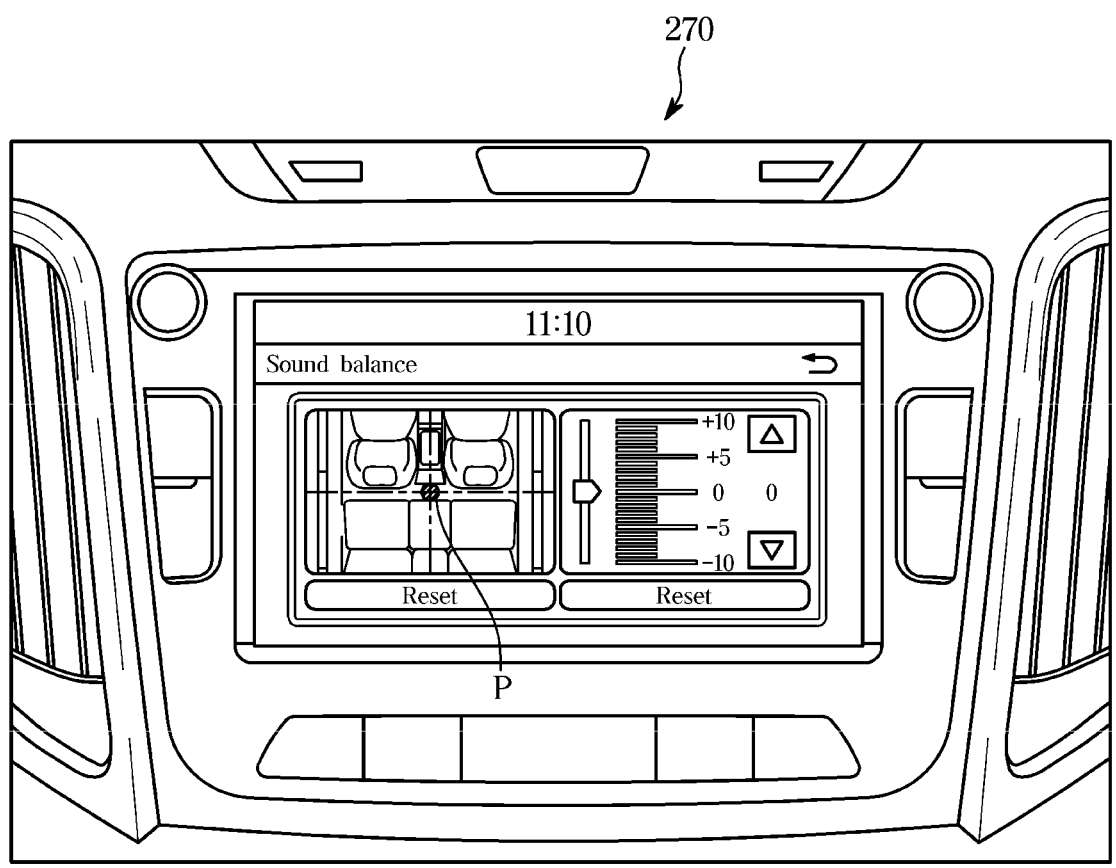
FIG. 4 is a view for describing visual display of sound distribution information.

The user interface 270 may receive an input for controlling parameters related to the sound source output through the at least one speaker 260. The controller 240 may receive an input signal from the user interface 270. The controller 240 may further control an output size of the sound source, an output position of the sound source, the ratio of a low sound, and the ratio of a high sound. As illustrated in FIG. 4, the user interface 270 may display that the sound is distributed within the vehicle 1 based on the output size and the output direction of the at least one speaker 260. In other words, the user interface 270 may display sound distribution information.

Hereinafter, the operations of the controller 240 of the disclosure is described in detail. As shown in FIG. 1, the controller 240 may include an image processor 241, a sound source provider 242, an emotion information obtainer 243, and a tag information manager 244.

The image processor 241 may receive the passenger's image from the camera 210 and analyze the passenger's image to identify the passenger. In addition, the image processor 241 may identify the passenger's facial expression and the passenger's position in the vehicle 1.

The sound source provider 242 may read the sound source from the storage 250 and control the speaker 260 so that the sound source is output. The storage 250 may store various contents including the sound source that can be outputted through the speaker 260. The sound source provider 242 may receive the sound source from the outside through the communicator 230 and control the speaker 260 to output the received sound source.

Figure 3:
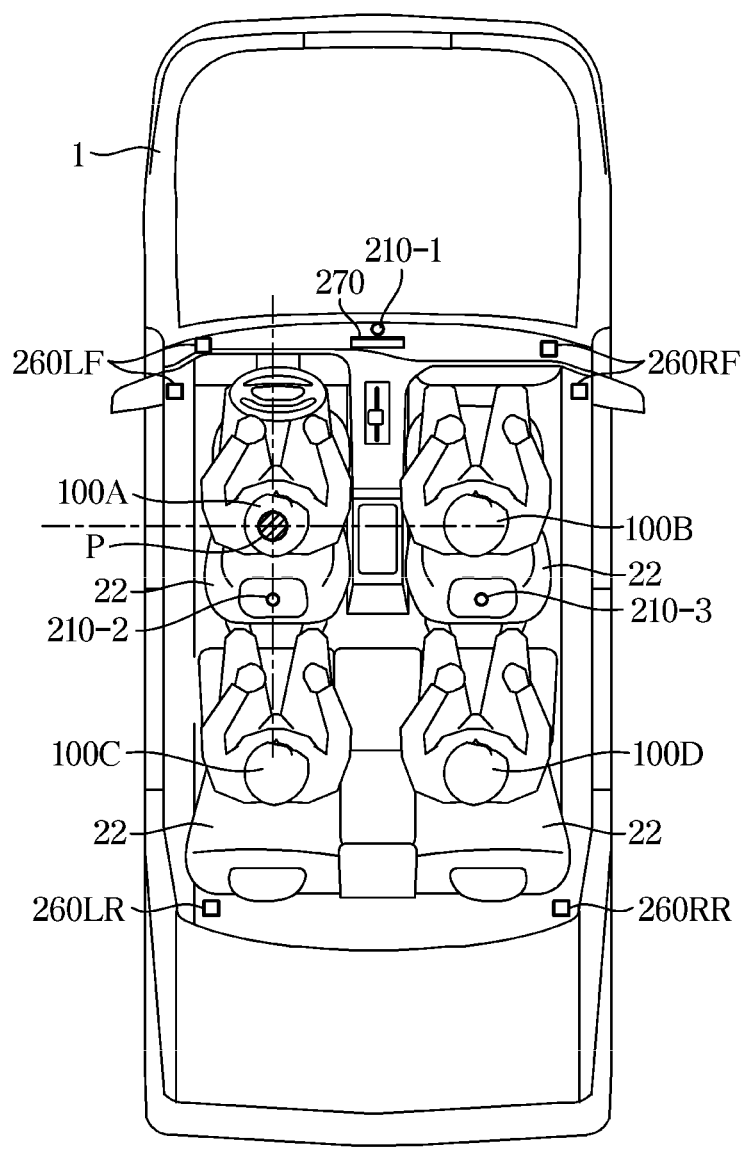

The sound source provider 242 may also control the output size and/or the output direction of the at least one speaker 260 based on the identified passenger's position. For example, as illustrated in FIG. 3, the sound source provider 242 may greatly control the output of the left front speaker 260LF. The sound source provider 242 may also control the outputs of the right front speaker 260RF, the left rear speaker 260LR, and the right rear speaker 260RR to be small. Also, the sound source provider 242 may control the output direction of the left front speaker 260LF so that it faces toward a passenger A (100A). The sound source provider 242 may also control the output directions of the right front speaker 260RF, the left rear speaker 260LR, and the right rear speaker 260RR so that they do not face toward the passenger 100A.

When the sound source provider 242 outputs a specific sound source, the sound source provider 242 may search the emotion tag information including the passenger's emotional information related to the sound source. When there are a plurality of the passengers, the sound source provider 242 may search for the emotion tag information related to each of the plurality of passengers. When the emotion tag information related to the output sound source is detected, the sound source provider 242 may control the output size and/or the output direction of the speaker 260 using the detected emotion tag information. When a plurality of the emotion tag information related to each of the plurality of passengers is detected, the output size and/or output direction of the speaker 260 may be controlled based on the position of each of the plurality of passengers and the plurality of emotion tag information.

For example, when the sound source is the 'DNA of Bangtan Boys' song, the sound source provider 242 may detect the emotion tag information including the passengers emotional information for the 'DNA of Bangtan Boys' song. When the passenger's emotional information is recorded in the detected emotion tag information with a negative emotion, the sound source provider 242 may control the output size of the speaker 260 outputting the sound toward the passenger to be small and may control the speaker 260 so that it does not face toward the passenger.

When the emotion tag information related to the output sound source is not detected, the sound source provider 242 may control the output size and/or output direction of the speaker 260 based on the passenger's emotional information obtained by the emotion information obtainer 243.

The emotion information obtainer 243 may obtain the passenger's emotional information based on the passenger's bio-signal measured by the sensor 220. When there are a plurality of the passengers, the emotion information obtainer 243 may obtain emotion information of each of the plurality of passengers. The emotion information obtainer 243 may also obtain the passengers emotional information using the passenger's facial expression identified by the image processor 241. Particularly, the emotion information obtainer 243 may obtain the passenger's emotional information using the correlation information between the passenger's bio-signal and the emotion factor and the emotion model.

When the emotion tag information related to the sound source to be outputted is not detected, the emotion information obtainer 243 may control the passenger's emotional information based on at least one of the bio-signal measured by the sensor 220 and the passenger's image obtained by the camera 210 for a predetermined time after the sound source is output. The predetermined time may be preset or may be set by the user.

The correlation between the bio-signal and the emotion factor and the emotion model will be described in detail in FIGS. 5 and 6 below.

The sound source provider 242 may control the output size and/or output direction of the speaker 260 so that a dominant emotion factor in the passenger's emotional information obtained by the emotion information obtainer 243 is increased or decreased. In other words, the output of the speaker 260 may be controlled so that the negative emotions of the passenger are improved to positive emotions. For example, referring to FIG. 5, the dominant emotion factor in the passenger's emotional information is an emotion factor of Boredom, which indicates that a value obtained by the EEG may be 0.477. Thus, the output size and/or output direction of the speaker 260 may be controlled to further reduce the value of the emotion factor of Boredom belonging to the negative emotion.

The tag information manager 244 may generate the emotion tag information based on the controlled output size of the speaker 260 and/or the controlled direction of the speaker 260 according to the passenger's emotional information for the specific sound source.

For example, the sound source output through the speaker 260 is the 'DNA of Bangtan Boys' and the passenger's emotional information for the sound source may be obtained with the negative emotion. The output of the speaker 260 close to the passenger's position may be controlled to be small and the direction of the speaker 260 outputting the sound source toward the passenger may be controlled so that it does not face toward the passenger. The tag information manager 244 may extract the controlled information by the speaker 260 to generate the emotion tag information.

In addition, the tag information manager 244 may add the generated emotion tag information to the output sound source. The sound source to which the emotion tag information is added may be stored in the storage 250.

On the other hand, when there are a plurality of the passengers, the tag information manager 244 may generate the emotion tag information related to each of the plurality of passengers based on the controlled output size of the speaker 260 and/or the controlled direction of the speaker 260 corresponding to the emotion information of each of the plurality of passengers.

FIG. 2 and FIG. 3 are views for describing distribution of sound output through a speaker in a vehicle according to a passenger's position and the passenger's emotional information.

As described above, the controller 240 may identify the passenger's position using the passenger's image obtained by the camera 210 or may identify the passenger's position using the information obtained by the sensor 220. In addition, the controller 240 may obtain the passengers emotional information using at least one of the passengers image obtained by the camera 210 and the passengers bio-signal obtained by the sensor 220.

The controller 240 may control the output size and/or the output direction of each of the speakers 260 when the sound source is being output from the speaker 260 (260LF, 260RF, 260LR, 260RR) provided in the vehicle 1. At this time, the controller 240 may control the output size and/or the output direction of the speaker 260 using the emotion tag information related to the identified passenger and the sound source.

Referring to FIG. 2, when there are four passengers 100A, 1006, 100C, and 100D, all four of the passengers' emotional information for the sound sources output through the plurality of speakers 260 (260LF, 260RF, 260LR, 260RR) may be positive emotions. In this case, the controller 240 may control the output size and the output direction of each of the speakers 260 so that sounds output through the plurality of speakers 260 can be uniformly distributed in the space in the vehicle 1. Therefore, the sound output by the plurality of speakers 260 is evenly distributed, and a position P at which the sound is concentrated may be the middle position of the space in the vehicle 1.

Referring to FIG. 3, the emotion information of the passenger A 100A may be obtained with the positive emotion for the sound sources output through the plurality of speakers 260 (260LF, 260RF, 260LR, 260RR), and the emotion information of the passengers B, C, and D (100B, 100C, and 100D) may be obtained with the negative emotion for the sound sources output through the plurality of speakers 260 (260LF, 260RF, 260LR, 260RR). In this case, the controller 240 may increase the output of the left front speaker 260LF and decrease the outputs of the right front speaker 260RF, the left rear speaker 260LR, and the right rear speaker 260RR.

The controller 240 may also control the output directions of the left front speaker 260LF, the right front speaker 260RF, the left rear speaker 260LR, and the right rear speaker 260RR so that they face toward the passenger A 100A. In this case, the sound output through the plurality of speakers 260 may be concentrated in the space in the vehicle 1 to the position P of the passenger A 100A. In other words, the sound output by the plurality of speakers 260 may be more distributed to the position of the passenger A 100A.

FIG. 4 is a view for describing visual display of sound distribution information.

Referring to FIG. 4, the user interface 270 may display the sound distribution information in the vehicle 1 based on the output size and the output direction of the speaker 260 controlled by the controller 240. The sound distribution information may include position information on the sound concentration in the vehicle 1, output size information and output direction information of the speaker 260, and the like.

FIG. 5 is a view illustrating correlation information between bio-signals and emotion factors.

Referring to FIG. 5, the correlation information between the GSR, the EEG, the facial expression and the emotion factor is illustrated.

In FIG. 5, a GSR signal has correlation values of 0.875 and 0.775 with emotion factors of Disgust and Anger, respectively, which indicates that the GSR signal has a high relevance with the emotion factors of Disgust and Anger. Therefore, the bio-signal of a passenger 200 collected by the GSR sensor may be the basis on which an emotion of the passenger 200 is determined as an anger emotion or a disgust emotion.

An emotion factor of Joy has a relatively low correlation value of 0.353 with the GSR signal, which indicates that the emotion factor of Joy is less relevant to the GSR signal.

An EEG signal has correlation values of 0.864 and 0.878 with emotion factors of Anger and Fear, respectively, which indicates that the EEG signal has a relatively higher relevance to the emotion factors of Anger and Fear than the other emotion factors. Therefore, the bio-signal collected by the EEG sensor may be the basis on which an emotion of the passenger 200 is determined as an anger emotion or a fear emotion.

In this way, the emotion information obtainer 243 may obtain the passenger's emotional information by using correlation information between the passenger's bio-signals and emotion factors. However, because the information illustrated in FIG. 5 is from experimental results, it may vary depending on the experimental environment.

Figure 6:
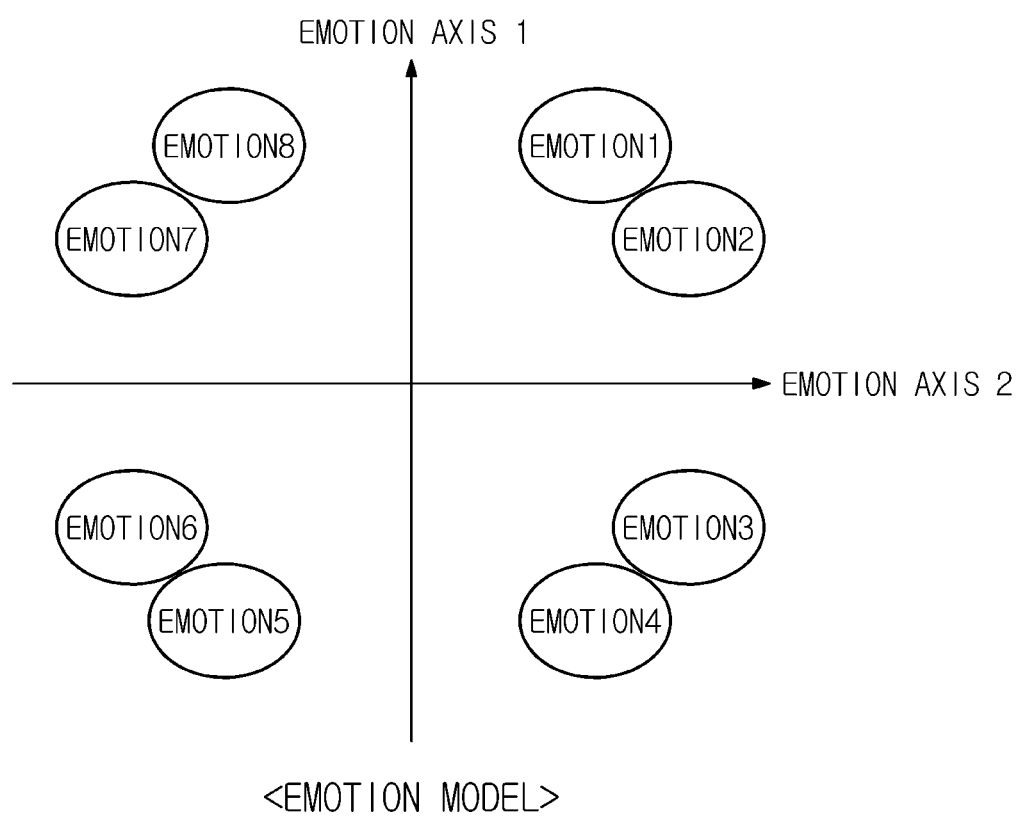
FIG. 6 is a view for describing an emotion model used for obtaining a passenger's emotional information.

FIG. 6 is a view illustrating an emotion model.

Referring to FIG. 6, the emotion model may be a graph illustrating the passenger's emotion classified according to the passenger's bio-signals. The emotion model may classify the passenger's emotion based on predetermined emotion axes. The emotion axes may be determined based on emotions measured by the sensor 220. For example, Emotional Axis 1 may be degrees of positivity or negativity, which are measurable by voices or facial expressions of the passenger. Emotional Axis 2 may be degrees of excitement or activity, which are measurable by the GSR or the EEG.

When the passenger's emotion has a high degree of positivity and a high degree of excitability, the emotion may be classified to emotion1 or emotion2. Conversely, when the passenger's emotion has minus (−) positivity, i.e., a high degree of negativity and a high degree of excitability, the emotion may be classified to emotion3 or emotion4.

The emotion model may be a Russell's emotion model. The Russell's emotion model may be expressed by a two-dimensional graph based on the x-axis and the y-axis, and may classify emotions to eight areas that are joy (0 degrees), excitement (45 degrees), arousal (90 degrees), pain (135 degrees), unpleasantness (180 degrees), depression (225 degrees), sleepiness (270 degrees), and relaxation (315 degrees). In addition, the eight areas may be divided into a total of 28 emotions that are classified into similar emotions belonging to the eight areas.

In this way, the controller 240 may obtain the passenger's emotional information by using the correlation information between the passenger's bio-signals and emotion factors and the emotion model.

Figure 7:
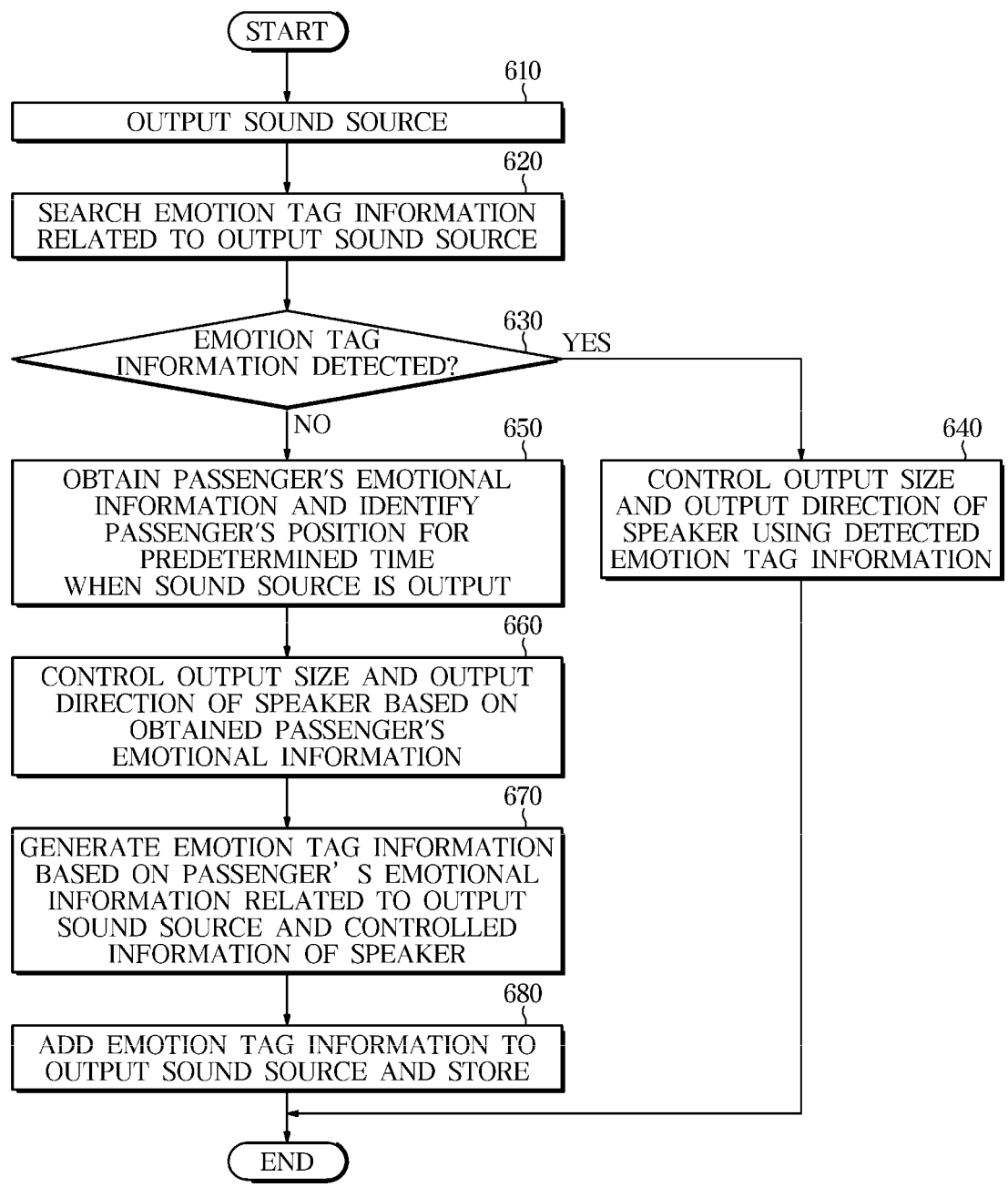
FIG. 7 is a flowchart for describing a method of controlling a vehicle according to an embodiment.

FIG. 7 is a flowchart describing a method of controlling a vehicle according to an embodiment.

Referring to FIG. 7, the controller 240 of the vehicle 1 may control the speaker 260 provided in the vehicle 1 to output the sound source (610). The controller 240 may identify the passenger using the passenger's image obtained by the camera 210 or the information obtained by the sensor 220, and search for the emotion tag information related to the identified passenger and the output sound source (620). The controller 240 may control the output size and the output direction of the speaker 260 using the detected emotion tag information when the emotion tag information is detected (630, 640).

The controller 240 may obtain the passenger's emotional information (650) using at least one of the bio-signal measured by the sensor 220 and the passenger's image obtained by the camera 210 for a predetermined time after the sound source is output. The controller 240 may also identify the passengers position (650). The controller 240 may then control the output size and/or output direction of the speaker 260 based on the passenger's position and the passenger's emotional information (660).

The controller 240 may generate the emotion tag information related to the output sound source by using the passenger's emotional information for the output sound source, and the controlled output size information of the speaker 260 and/or the controlled output direction of the speaker 260 (670). The controller 240 may add the generated emotion tag information to the output sound source and store the sound source to which the emotion tag information is added in the storage 250 (680).

As is apparent from the above description, the disclosure can obtain the passenger's emotional information with respect to content output through the speaker in the vehicle and automatically control a size and an output direction of a speaker output according to the passenger's emotional information, and a method of controlling the vehicle. Therefore, it is possible to accurately grasp the passenger's emotion, appropriately distribute the sound output through the speaker in the vehicle and improve the auditory comfort of the passenger.

The disclosed embodiments may be implemented in the form of a recording medium storing instructions that are executable by a computer. The instructions may be stored in the form of a program code or computer-executable code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, and the like.

The embodiments of the disclosure have thus far been described with reference to the accompanying drawings. It will be understood by those of ordinary skill in the art that the disclosure may be practiced in other forms than the embodiments as described above without changing the technical idea or essential features of the disclosure. The above embodiments are only by way of example and should not be interpreted in a limited sense.

What is claimed is:
1. A vehicle comprising:
at least one speaker;
a camera configured to capture inside of the vehicle and generate image data;
a sensor configured to measure a bio-signal of a passenger;
a storage configured to store a sound source and store emotion tag information related to the sound source; and
a controller configured to:
control the at least one speaker to output the sound source stored in the storage,
receive the image data from the camera,
identify the passenger and a position of the passenger based on the received image data,
search for the emotion tag information related to the identified passenger and the output sound source in the storage, and
when the emotion tag information is detected in the storage, adjust an output size and an output direction of the at least one speaker based on the detected emotion tag information and the position of the passenger, or
when the emotion tag information is not detected in the storage, obtain emotional information of the passenger based on at least one of the bio-signal or the image data and adjust the output size and the output direction of the at least one speaker based on the obtained emotional information and the position of the passenger.

2. The vehicle according to claim 1, wherein the controller is configured to extract an emotion factor from the obtained emotional information, and to adjust the output size and the output direction of the at least one speaker so that the emotion factor is increased or decreased.

3. The vehicle according to claim 1, wherein the controller is configured to generate the emotion tag information based on the adjusted output size and the adjusted output direction of the at least one speaker corresponding to the obtained emotional information, and add the generated emotion tag information to the output sound source.

4. The vehicle according to claim 1, wherein the controller is configured to extract a passenger facial expression from the image data obtained for the predetermined time after the sound source is output, and obtain the emotional information based on the extracted passenger facial expression.

5. The vehicle according to claim 1, wherein the controller is configured to:
identify a plurality of passengers and a position of each of the plurality of passengers based on the obtained image data by the camera; and
search for a plurality of emotion tag information related to each of the plurality of passengers in the storage.

6. The vehicle according to claim 5, wherein, when the plurality of emotion tag information related to each of the plurality of passengers is detected, the controller is configured to adjust the output size and the output direction of the at least one speaker based on the detected plurality of emotion tag information and the position of each of the plurality of passengers.

7. The vehicle according to claim 5, wherein, when the plurality of emotion tag information related to each of the plurality of passengers is not detected, the controller is configured to:
obtain emotion information of each of the plurality of passengers for a predetermined time after the sound source is output; and
adjust the output size and the output direction of the at least one speaker based on the obtained emotion information of each of the plurality of passengers and the position of each of the plurality of passengers.

8. The vehicle according to claim 7, wherein the controller is configured to generate the plurality of emotion tag information based on the adjusted output size and the adjusted output direction of the at least one speaker corresponding to the obtained emotion information of each of the plurality of passengers, and add the generated plurality of emotion tag information to the output sound source.

9. A method of controlling a vehicle, the method comprising:
outputting a sound source stored in a storage through at least one speaker;
obtaining, by a camera, image data inside the vehicle;

identifying, by a controller, a passenger and a position of the identified passenger based on the obtained image data;

measuring, by the sensor, a bio-signal of the identified passenger;

searching for, by the controller, emotion tag information related to the identified passenger and the output sound source in the storage; and when the emotion tag information is detected in the storage, adjusting an output size and an output direction of the at least one speaker based on the detected emotion tag information and the position of the identified passenger, or when the emotion tag information is not detected in the storage, obtaining emotional information of the identified passenger based on at least one of the bio-signal or the image data and adjusting the output size and the output direction of the at least one speaker based on the obtained emotional information and the position of the identified passenger.

10. The method according to claim 9, wherein the adjusting the output size and the output direction of the at least one speaker comprises:

extracting an emotion factor from the obtained emotional information; and adjusting the output size and the output direction of the at least one speaker so that the emotion factor is increased or decreased.

11. The method according to claim 9, further comprising:

generating, by the controller, the emotion tag information based on the adjusted output size and the adjusted output direction of the at least one speaker corresponding to the obtained emotional information; and adding, by the controller, the generated emotion tag information to the output sound source.

12. The method according to claim 9, further comprising:

extracting, by the controller, a passenger facial expression from the image data for a predetermined time after the sound source is output; and obtaining, by the controller, the emotional information based on the extracted passenger facial expression.

13. A method of controlling a vehicle, the method comprising:

outputting a sound source stored in a storage through at least one speaker;

obtaining, by a camera image data inside the vehicle;

identifying, by a controller, a plurality of passengers and a position of each of the plurality of passengers based on the obtained image data;

measuring, by the sensor, bio-signals of the plurality of passengers;

searching for, by the controller, a plurality of emotion tag information related to each of the plurality of passengers and the output sound source in the storage; and when the plurality of emotion tag information is detected in the storage, adjusting an output size and an output direction of the at least one speaker based on the detected plurality of emotion tag information and the position of each of the plurality of the passengers, or when the plurality of emotion tag information is not detected in the storage, obtaining emotional information of each of the plurality of passengers based on at least one of the bio-signals or the image data and adjusting the output size and the output direction of the at least one speaker based on the obtained emotional information and the position of each of the plurality of passengers.

14. The method according to claim 13, further comprising:

generating, by the controller, the plurality of emotion tag information based on the adjusted output size and the adjusted output direction of the at least one speaker corresponding to the obtained emotion information of each of the plurality of passengers; and adding, by the controller, the generated plurality of emotion tag information to the output sound source.

* * * * *